(12) United States Patent  
Li et al.

(10) Patent No.: US 7,779,689 B2
(45) Date of Patent: Aug. 24, 2010

(54) MULTIPLE AXIS TRANSDUCER WITH MULTIPLE SENSING RANGE CAPABILITY

(75) Inventors: Gary G. Li, Gilbert, AZ (US); Todd F. Miller, Scottsdale, AZ (US); David J. Monk, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 63 days.

(21) Appl. No.: 11/677,127

(22) Filed: Feb. 21, 2007

(65) Prior Publication Data

US 2008/0196499 A1  Aug. 21, 2008

(51) Int. Cl.
  *G01P 15/18* (2006.01)
  *G01P 15/125* (2006.01)
  *G01P 1/02* (2006.01)
(52) U.S. Cl. .................. 73/510; 73/514.32; 73/493
(58) Field of Classification Search ............ 73/493, 73/431, 514.32, 514.38, 514.29, 504.12, 73/504.14, 514.36, 510
See application file for complete search history.

(56) References Cited

U.S. PATENT DOCUMENTS

| | | | | |
|---|---|---|---|---|
| 4,590,801 A | * | 5/1986 | Merhav | 73/510 |
| 4,601,206 A | * | 7/1986 | Watson | 73/510 |
| 5,723,790 A | * | 3/1998 | Andersson | 73/514.36 |
| 5,959,209 A | * | 9/1999 | Takeuchi et al. | 73/514.34 |
| 6,122,965 A | * | 9/2000 | Seidel et al. | 73/514.36 |
| 6,131,457 A | * | 10/2000 | Sato | 73/514.31 |
| 6,701,788 B2 | * | 3/2004 | Babala | 73/649 |
| 6,829,937 B2 | * | 12/2004 | Mahon | 73/514.29 |
| 6,837,107 B2 | * | 1/2005 | Geen | 73/504.04 |
| 6,862,795 B2 | * | 3/2005 | Mahon | 29/595 |
| 6,973,844 B2 | * | 12/2005 | Sakai | 73/862.041 |
| 7,040,922 B2 | * | 5/2006 | Harney et al. | 439/527 |
| 7,104,128 B2 | * | 9/2006 | Inglese et al. | 73/514.01 |
| 7,152,474 B2 | | 12/2006 | Deb et al. | |
| 7,210,356 B2 | * | 5/2007 | Bernhagen | 73/661 |
| 7,243,545 B2 | * | 7/2007 | Sakai et al. | 73/514.32 |
| 7,284,429 B2 | * | 10/2007 | Chaumet et al. | 73/504.12 |
| 7,316,965 B2 | * | 1/2008 | Hooper et al. | 438/460 |
| 7,401,517 B2 | * | 7/2008 | Pan et al. | 73/504.16 |
| 7,424,826 B2 | * | 9/2008 | Hua et al. | 73/514.05 |
| 7,458,263 B2 | * | 12/2008 | Nasiri et al. | 73/504.12 |

(Continued)

OTHER PUBLICATIONS

Robert Bosch GmbH—Automotive Equipment, Oct. 2005, www.bosch-presse.de/TBWebDB/en-US/Presstext.cfm?CFID=1354040&CFTOKEN=&ID=..., 2 pages.

*Primary Examiner*—Helen C. Kwok
(74) *Attorney, Agent, or Firm*—Meschkow & Gresham, P.L.C.

(57) ABSTRACT

A transducer package 20 includes a substrate 32 having a first axis of symmetry 36 and a second axis of symmetry 38 arranged orthogonal to the first axis of symmetry 36. At least a first sensor 50 and a second sensor 52 each of which are symmetrically arranged on the substrate 32 relative to one of the first and second axes of symmetry 36 and 38. The first and second sensors 50 and 52 are adapted to detect movement parallel to the other of the first and second axes of symmetry 36 and 38. The first sensor 50 is adapted to detect movement over a first sensing range and the second sensor 52 is adapted to detect movement over a second sensing range, the second sensing range differing from the first sensing range.

17 Claims, 4 Drawing Sheets

U.S. PATENT DOCUMENTS

2006/0027031 A1 2/2006 Ealey
2006/0037397 A1 2/2006 Memishian
2006/0042382 A1 3/2006 DCamp et al.

* cited by examiner $$C_L - C_R = \Delta C$$

$$(C_{L(ACCEL)} + C_{L(THERMAL)}) - (C_{R(ACCEL)} + C_{R(THERMAL)}) = \Delta C$$

DUE TO SYMMETRY: $C_{L(THERMAL)} \approx C_{R(THERMAL)}$

THEREFORE:

$$C_{L(ACCEL)} - C_{R(ACCEL)} = \Delta C$$

MULTIPLE AXIS TRANSDUCER WITH MULTIPLE SENSING RANGE CAPABILITY

TECHNICAL FIELD OF THE INVENTION

The present invention relates generally to transducers. More specifically, the present invention relates to a multiple axis transducer package having multiple sensing range capability.

BACKGROUND OF THE INVENTION

An accelerometer is a sensor typically utilized for measuring acceleration forces. These forces may be static, like the constant force of gravity, or they can be dynamic, caused by moving or vibrating the accelerometer. Accelerometers are used along with gyroscopes in inertial guidance systems, as well as in many other scientific and engineering systems. One of the most common uses for micro electromechanical system (MEMS) accelerometers is in airbag deployment systems for vehicles. In this capacity, the accelerometers are used to detect the rapid negative acceleration of a vehicle to determine when a collision has occurred and the severity of the collision in order to control deployment of the airbags. Another common use for MEMS accelerometers is in electronic stability control systems, also referred to as vehicle dynamic control, designed to improve a vehicle's handling, particularly at the limits where the driver might lose control of the vehicle.

In certain applications, it may be desirable to employ multiple sensors to detect and measure movement of an object in more than one dimension. To accomplish this task, many prior art devices utilize a cluster of individual packages, each containing a single sensor that detects movement in a particular plane. The multiple axis transducer packages are more complex than their single axis counterparts, which puts pressure on the size, cost, and accuracy of these devices.

One problem that affects the accuracy of transducer packages is that of undesirably high thermal offset. Thermal offset is the non-acceleration induced stress as a function of temperature that is placed on a semiconductor device such as a MEMS device. The temperature coefficient of offset (TCO) is a measure of this non-acceleration induced stress. A large TCO can result in measurement inaccuracies within the MEMS transducer package, thus requiring compensation to reduce the TCO to near zero. Tighter design specifications on the range of allowable thermally induced offset are being called for within the industry to reduce these inaccuracies.

Further increasing the complexity of multiple axis transducer packages is the requirement for accurately measuring movement within different sensing ranges. That is, there is an increasing need for one sensor to detect movement in one sensing range and another sensor to detect movement in a different sensing range within a single multiple axis transducer package. For example, in an airbag deployment system, a first accelerometer of the transducer package may be utilized to detect the rapid deceleration of a vehicle in order to control deployment of the front airbags. A second accelerometer of the transducer package may be utilized to detect side collisions in order to control deployment of the side airbags. For front airbag deployment applications, the sensing range may be a medium-g sensing range of, for example, ten to one hundred g's. In contrast, for side airbag deployment applications, the sensing range may be a high-g sensing range of, for example, greater than one hundred g's. Still other applications call for a low-g sensing range of, for example, less than ten g's. Such an application may be found in vehicle dynamics control.

Accordingly, what is needed is a multiple axis transducer package that is small, inexpensive, and accurate. What is further needed is a multiple axis transducer package that is largely impervious to thermally induced offset and may be readily adapted to detect movement over different sensing ranges along mutually orthogonal axes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

In accordance with the teachings herein, a compact multiple axis transducer package is provided as an example for illustrative purposes. Embodiments of the multiple axis transducer may include two or more sensors, which may be, for example, accelerometers. The multiple accelerometers can be adapted to detect movement in two orthogonal axes that are parallel to a planar surface of the transducer. The accelerometers are symmetrically arranged on the planar surface of the substrate to reduce unwanted thermally induced offset. In addition, the multiple accelerometers may be adapted to detect movement at different acceleration sensing ranges, i.e., g levels.

Figure 1:
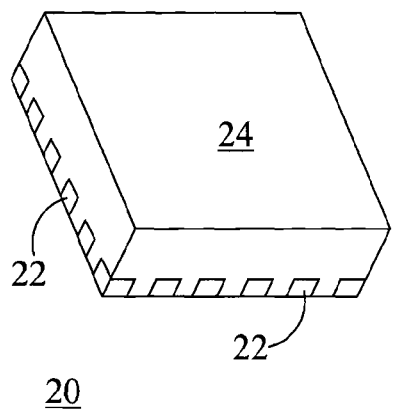
FIG. 1 shows a perspective view of a transducer package in accordance with an embodiment of the present invention.

FIG. 1 shows a perspective view of a transducer package 20 in accordance with an embodiment of the present invention. In one embodiment, transducer package 20 is a quad flat no-lead (QFN) integrated circuit transducer package having an exposed lead frame made up of peripheral terminal pads 22 and an exposed die attach pad (not visible), for mechanical and thermal integrity. A molding compound 24 encases the electrical and micro electromechanical system (MEMS) components (discussed below) that are mounted on the lead frame. A QFN package may be used in a variety of applications that call for low standoff heights, improved thermal performance, reduced size, and/or reduced weight. Although transducer package 20 is described in terms of a QFN packaging technique, such is not a limitation of the present invention. Other packaging techniques, such as a Small-Outline Integrated Circuit (SOIC) packages with leads extending from each of the four sides may alternatively be utilized. Furthermore, it should be appreciated by those skilled in the art that another embodiment could include side-by-side die in a SOIC or other common MEMS sensor package.

Figure 2:
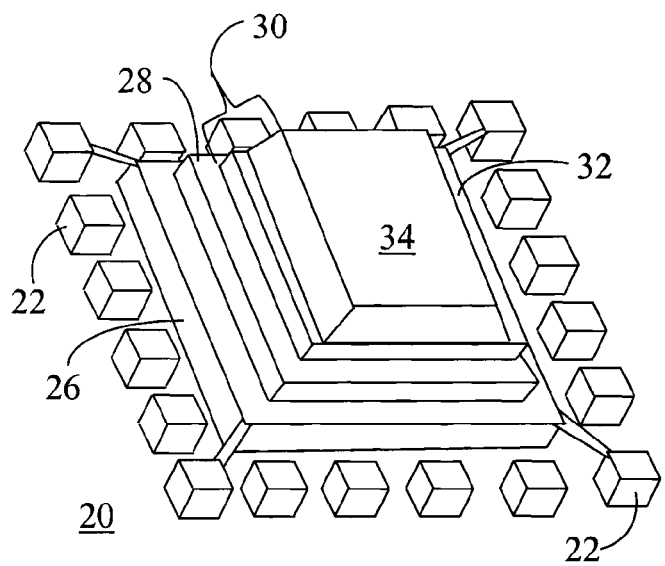
FIG. 2 shows a perspective view of the transducer package of FIG. 1 with a molding compound removed to reveal its interior components.

FIG. 2 shows a perspective view of the transducer package 20 with molding compound 24 (FIG. 1) removed to reveal its interior components. Peripheral terminal pads 22 and a die attach pad 26 of the lead frame form a bottom layer of package 20. An application specific integrated circuit (ASIC), referred to herein as a control circuit 28, is coupled to the top of die attach pad 26, and a MEMS sensor 30 is coupled to the top of control circuit 28. MEMS sensor 30 includes a substrate 32 on which sensors are formed. MEMS devices, such as MEMS sensor 30, typically require a cavity package with a lid. Consequently, MEMS sensor 30 includes a cap 34, or lid, that hermetically seals and protects the underlying sensors.

Figure 3:
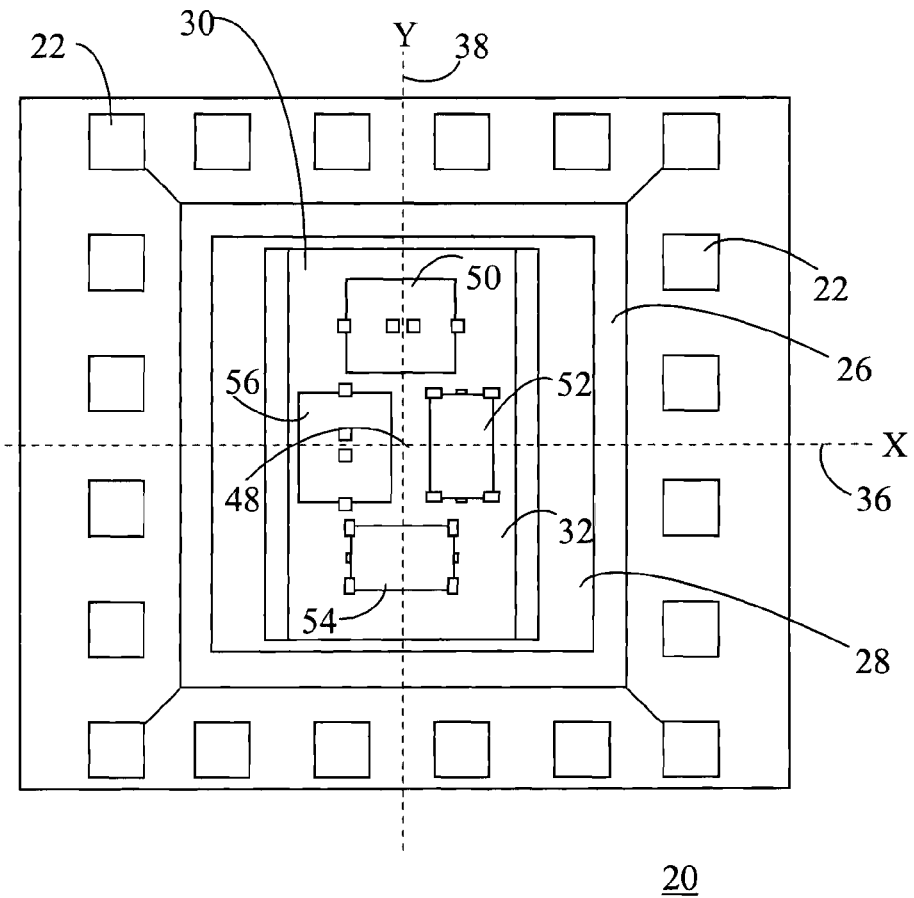
FIG. 3 shows a top view of the transducer package of FIG. 1.

FIG. 3 shows a top view of transducer package 20. In the view of FIG. 3, both molding compound 24 (FIG. 1) and cap 34 (FIG. 2) have been removed to reveal the underlying structures of MEMS sensor 30. In this embodiment, transducer package 20 exhibits a first axis of symmetry 36 and a second axis of symmetry 38 that is arranged orthogonal to first axis of symmetry 36. In general, the combination of first and second axes of symmetry 36 and 38, respectively, yields a configuration in which transducer package 20 is centered, or balanced at an intersection 48 of first and second axes of symmetry 36 and 38. The symmetrical packaging configuration of transducer package 20 results in thermally induced stresses that are generally the same on either side of first axis of symmetry 36 and second axis of symmetry 38.

MEMS sensor 30 includes multiple sensors which may be, for example, a first accelerometer 50, a second accelerometer 52, a third accelerometer 54, and a fourth accelerometer 56 disposed on substrate 32. Each of first and third accelerometers 50 and 54, respectively, are symmetrically arranged on substrate 32 relative to second axis of symmetry 38, and are adapted to detect movement substantially parallel to first axis of symmetry 36. Conversely, each of second and fourth accelerometers 52 and 56, respectively, are symmetrically arranged on substrate 32 relative to first axis of symmetry 36, and are adapted to detect movement substantially parallel to second axis of symmetry 38.

The term "symmetrically arranged" is utilized to describe a configuration in which each individual accelerometer 50, 52, 54, and 56 is centered at its corresponding first or second axis of symmetry 36 or 38, respectively. However, pairs of accelerometers, for example, first and third accelerometers 50 and 54, respectively, and second and fourth accelerometers 52 and 56, respectively, need not be symmetrically positioned on substrate 32 relative to one another. Thus, MEMS sensor 30 is a multiple axis sensor, capable of detecting movement along two axes that are generally parallel to the plane of transducer package 20. The balanced configuration of transducer package 20 and the symmetrical arrangement of each of accelerometers 50, 52, 54, and 56 relative to first and second axes of symmetry 36 and 38, respectively, reduces the effects of thermally induced stresses on MEMS sensor 30 that could otherwise effect the accuracy of first, second, third, and fourth accelerometers 50, 52, 54, and 56, as discussed in detail below.

In one embodiment, first and fourth accelerometers 50 and 56 may be low-g accelerometers. Accordingly, first and fourth accelerometers 50 and 56 are suitable for detection of acceleration at low-g levels of, for example less than ten g's. Second and third accelerometers 52 and 54, respectively, may be medium-g accelerometers suitable for detection of acceleration at medium-g levels of, for example, between ten and one hundred g's. Thus, first and fourth accelerometers 50 and 56, respectively, sense acceleration over a first sensing range (low-g) that differs from the second sensing range (medium-g) of second and third accelerometers 52 and 54, respectively.

Although transducer package 20 is shown with a total of four accelerometers, it should be understood that in other embodiments, a transducer package may include at least two or more than four accelerometers with each individual accelerometer being symmetrically disposed relative to an axis of symmetry that is orthogonal to its sensing axis. In addition, although low-g and medium-g accelerometers are mentioned herein, it should be further understood that in other embodiments a transducer package may include any combination of low-g, medium-g, and high-g accelerometers specified for a particular application. Moreover, although particular sensing ranges are mentioned herein, it should be understood that a variety of sensing ranges may be established.

Figures 4, 5:
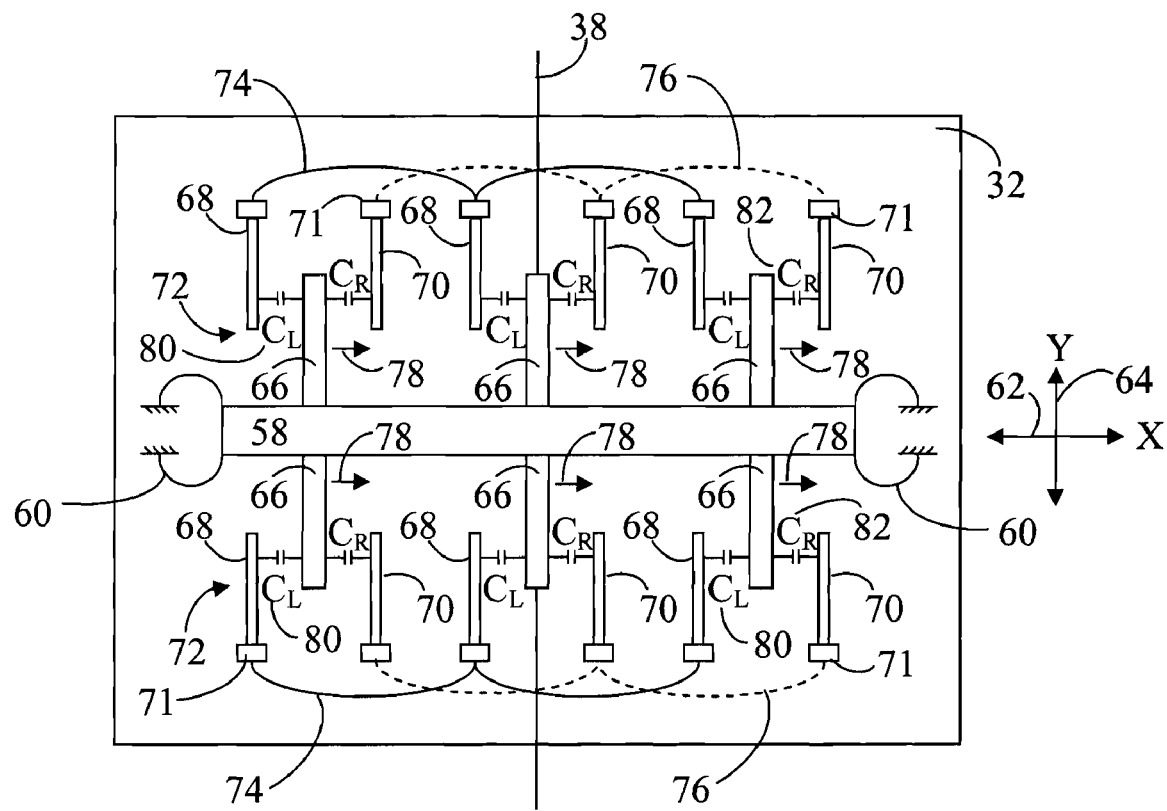
FIG. 4 shows a block diagram of an accelerometer of the transducer package.
FIG. 5 shows a table illustrating the differential capacitance profile of the accelerometer of FIG. 4.

FIG. 4 shows a block diagram of first accelerometer 50 of transducer package 20. First accelerometer 50 is discussed herein for brevity. However, it should be understood the following discussion applies similarly to third accelerometer 54 (FIG. 2) symmetrically disposed on substrate 32 relative to second axis of symmetry 38, and to second and fourth accelerometers 52 and 56 (FIG. 3) symmetrically disposed on substrate 32 relative to first axis of symmetry 36 (FIG. 3). First accelerometer 50 is representative of a MEMS accelerometer structure and is shown herein for clarity of understanding. However, it should be understood that a number of known and upcoming MEMS accelerometer structures may be utilized as first accelerometer 50.

First accelerometer 50 is a capacitive accelerometer. As such, first accelerometer 50 includes a movable proof mass 58 attached to anchors 60 that are, in turn, mounted on the planar substrate 32. Anchors 60 are preferably compliant in two mutually orthogonal directions, referred to therein as an X direction 62 and a Y direction 64. Second axis of symmetry 38 is substantially parallel to Y direction 64, and is therefore substantially perpendicular to X direction 62. Sense fingers 66 extend from proof mass 58, and are longitudinally aligned with second axis of symmetry 38. First accelerometer 50 further includes first fixed fingers 68 and second fixed fingers 70 longitudinally aligned with second axis of symmetry 38. First and second fixed fingers 68 and 70, respectively, are coupled to substrate 32 via fixed, non-compliant anchors 71.

Proof mass 58, sense fingers 66, first fixed fingers 68, and second fixed fingers 70 are symmetrically disposed relative to second axis of symmetry 38. More specifically, proof mass 58 is centered at second axis of symmetry 38 and an equivalent proportion of sense fingers 66, first fingers 68, and second fingers 70 are arranged on either side of second axis of symmetry 38.

Each of sense fingers 66 is disposed between a pair of fixed fingers, i.e., one of first fixed fingers 68 and one of second fixed fingers 70, to form a differential capacitive structure 72. Each of first fixed fingers 68 may be linked by first polystraps 74 and each of second fixed fingers 70 may be linked by second polystraps 76, as known to those skilled in the art, to sum the outputs of each differential capacitive structure 72. The summed output can then be conveyed via a polyrunner (not shown), as known to those skilled in the art, to an off-chip lead (not shown) for further processing by control circuit 28 (FIG. 1).

Capacitive accelerometers sense a change in electrical capacitance, with respect to acceleration, to vary the output of an energized circuit. In this illustration, sense fingers 66 are X sense fingers, and first accelerometer 50 detects movement in X direction 62. That is, when first accelerometer 50 is subject to acceleration in X direction 62, the distance between each of sense fingers 66 and their adjacent pair of first and second fixed fingers 68 and 70, respectively, changes. This change in distance is represented by arrows 78. Consequently, the capacitance changes between these fingers. This change in capacitance is registered by sense circuitry (not shown) and is converted to an output signal representative of the acceleration in X direction 62. Of course, acceleration in Y direction 64 is sensed in an analogous manner by registering the change in capacitance between the sense fingers and corresponding pairs of fixed fingers of second accelerometer 52 (FIG. 3) and fourth accelerometer 56 (FIG. 3), all of which are longitudinally aligned with first axis of symmetry 36 (FIG. 3).

Referring to FIGS. 4 and 5, FIG. 5 shows a table illustrating the differential capacitance profile of first accelerometer 50. A first capacitance, $C_L$, 80 is sensed between each of sense fingers 66 and their adjacent first fixed fingers 68. A second capacitance, $C_R$, 82 is sensed between each of sense fingers 66 and their adjacent second fixed fingers 70. The difference between first capacitance 80 and second capacitance 82 is the change in capacitance, $\Delta C$, 84. In this example, as proof mass 58 and sense fingers 66 move rightward due to acceleration in X direction 62, first capacitance 80 decreases and second capacitance 82 increases. Conversely, as proof mass 58 and sense fingers 66 move leftward due to acceleration in X direction 62, first capacitance 80 increases and second capacitance 82 decreases.

First accelerometer 50 may be affected by thermally induced offset. That is, as transducer package 20 (FIG. 1) is subjected to a high temperature environment, transducer package 20 may undergo some bending, relative to its Z axis, and in-plane displacement known as thermally induced offset. This thermally induced offset is registered as a capacitance change at each differential capacitive structure 72. For illustrative purposes, first capacitance 80 may thus be represented by a first capacitance component, $C_{L(ACCEL)}$, 86 due to acceleration and a first thermally induced artifact signal, $C_{L(THERMAL)}$, 88. Likewise, second capacitance 82 may thus be represented by a second capacitance component, $C_{R(ACCEL)}$, 90 due to acceleration and a second thermally induced artifact signal, $C_{R(THERMAL)}$, 92.

Due to the symmetrical arrangement of first accelerometer 50 relative to second axis of symmetry 38 and the balanced configuration of transducer package 20 (FIG. 1) relative to first and second axes of symmetry 36 and 38, respectively (FIG. 3), the bending and in-plane displacement of transducer package 20 is approximately equal on opposing sides of first and second axes of symmetry 36 and 38, respectively. Consequently, first artifact signal, $C_{L(THERMAL)}$, 88 and second artifact signal, $C_{R(THERMAL)}$, 92 will have substantially identical characteristics. More specifically, first and second artifact signals 88 and 92 are substantially equivalent. Therefore, due to the differential nature of structure 72, they will automatically nullify, or cancel one another out. What remains, therefore, is largely the change in capacitance, $\Delta C$, 84 resulting from the difference between first capacitance component, $C_{L(ACCEL)}$, 86 and second capacitance component, $C_{R(ACCEL)}$, 90.

Figure 6:
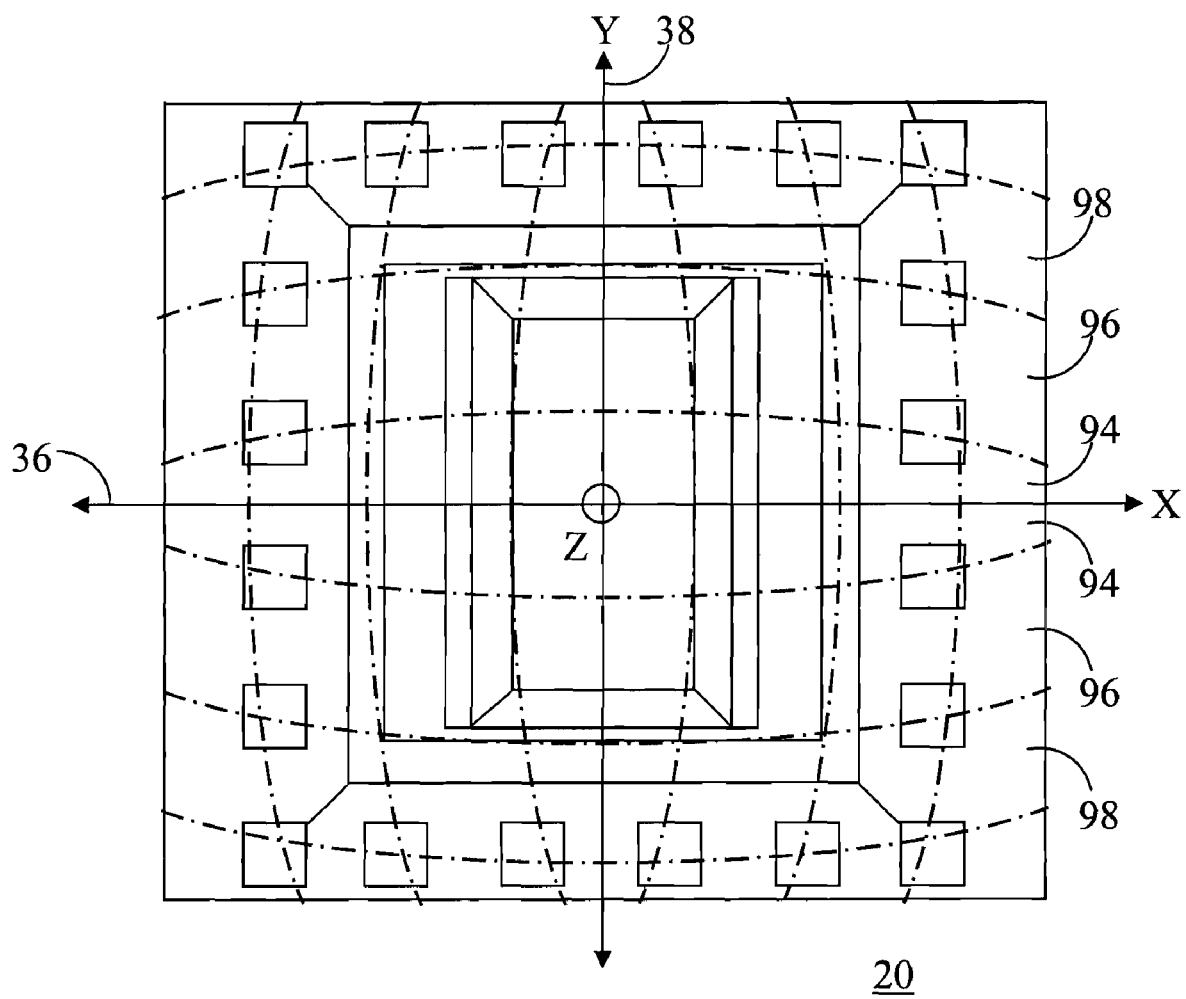
FIG. 6 shows a schematic view of the transducer package illustrating stylized contour regions of transducer package in response to an elevated temperature environment in which the transducer package may be located.

FIG. 6 shows a schematic view of transducer package 20 illustrating stylized contour regions of displacement in response to an elevated temperature environment in which transducer package 20 may be located. In general, the symmetrical configuration of transducer package 20 results in first contour regions 94 on opposing sides of first axis of symmetry 36 that experience similar displacements. Second contour regions 96 on opposing sides of first axis of symmetry 36, and displaced outward from first contour regions 94, experience displacements that are comparable to one another, although they are larger displacements then those experienced in first contour regions 94. Likewise, third contour regions 98 on opposing sides of first axis of symmetry 36, and displaced outward from second contour regions 96, experience displacements that are comparable to one another, although they are larger displacements then those experienced in second contour regions 96. Similarly, contour regions of displacement relative to second axis of symmetry 38 will have similar characteristics, again due to the balanced arrangement of transducer package 20.

Despite the displacements experienced in an elevated temperature environment, the symmetrical configuration of each of first, second, third, and fourth accelerometers 50, 52, 54, and 56 (FIG. 3) will result in the automatic cancellation of thermally induced artifact signals, such as first and second artifact signals 88 and 92, respectively (FIG. 5).

Figure 7:
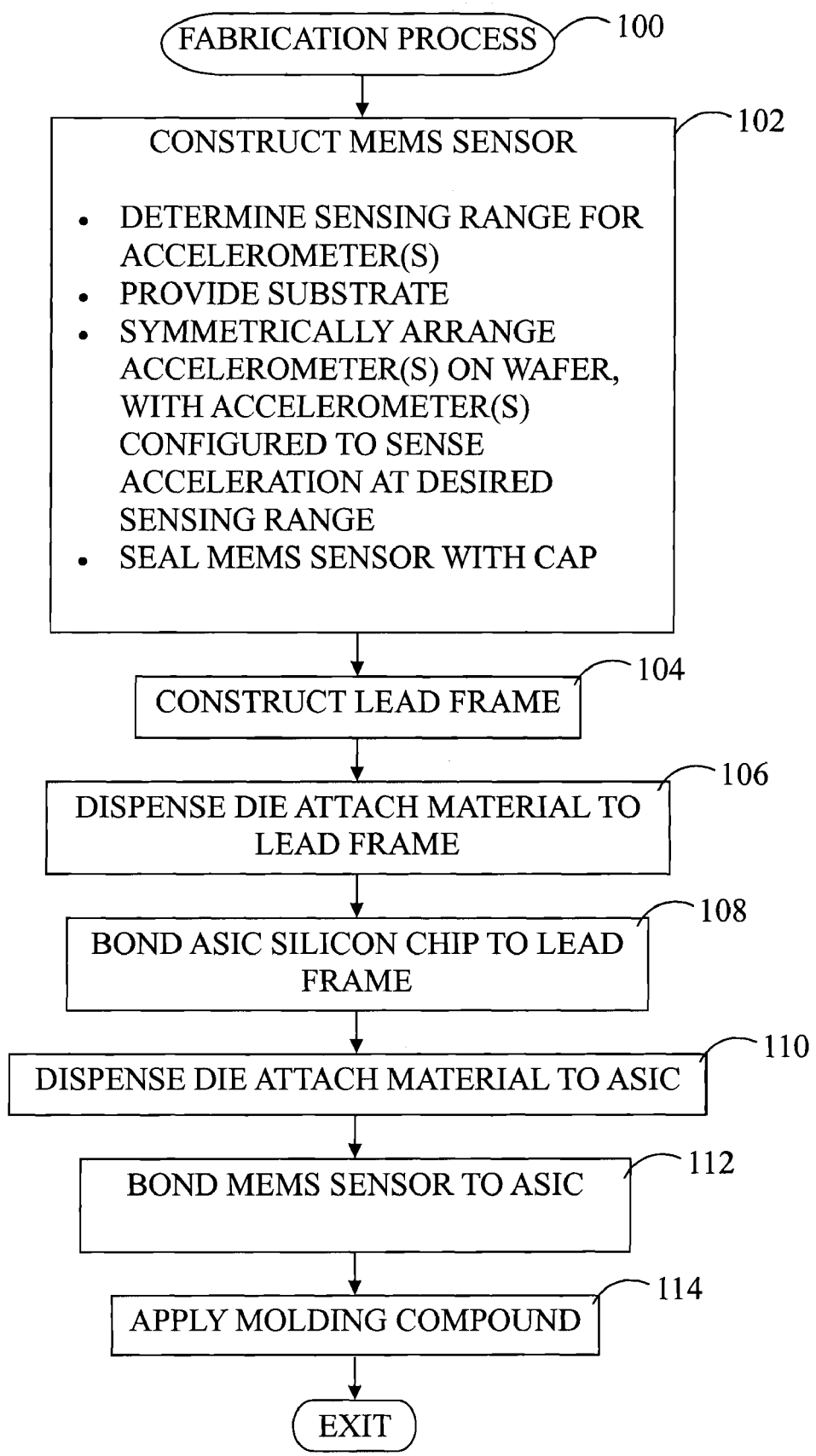
FIG. 7 shows a flowchart of a fabrication process for producing the transducer package.

FIG. 7 shows a flowchart of a fabrication process 100 for producing transducer package 20 (FIG. 1). Fabrication process 100 is provided for illustrative purposes. It should be understood, however, that alternative process flows may be contemplated by those skilled in the art. Fabrication process 100 is described below in connection with the fabrication of a single transducer package 20. However, it should be understood by those skilled in the art that the following process allows for concurrent manufacturing of a plurality of transducer packages 20 at a time. The individual transducer packages 20 can then be cut, or diced, in a conventional manner to provide individual transducer packages 20 for installation into a device or system, such as an inertial guidance system, an airbag deployment system, or another scientific or engineering system.

Fabrication begins with a task 102. At task 102, MEMS sensor 30 (FIG. 2) is constructed. Construction of MEMS sensor 30 entails determining the sensing range, for example, low-g, medium-g, and high-g, for each of first, second, third, and fourth accelerometers 50, 52, 54, and 56 (FIG. 3), providing planar substrate 32 (FIG. 2), and symmetrically arranging each of first, second, third, and fourth accelerometers 50, 52, 54, and 56 on substrate 32, each of which is configured to sense acceleration at the desired sensing range. Cap 34 (FIG. 2) is applied to MEMS sensor 30 after MEMS sensor 30 is constructed to form a hermetically sealed transducer.

MEMS sensor 30 may be constructed in accordance with conventional MEMS process technologies, such as, for example, surface micromachining using a number of different materials. Surface micromachining is based on the deposition, patterning, and etching of different structural layers. Surface micromachining enables the fabrication of high-quality MEMS devices because it is based on thin-film technology that combines control and flexibility in fabrication. By way of example, a planar surface of substrate 32 may be deposited with a conductive material layer. This conductive material can then be masked, patterned, and etched to define proof mass 58 (FIG. 4), sense fingers 66 (FIG. 4), first fixed fingers 68 (FIG. 4), and second fixed fingers 70 (FIG. 4) for each of first, second, third, and fourth accelerometers 50, 52, 54, and 56, respectively.

For simplicity, the construction of MEMS sensor 30 at task 102 is described herein as being a serial operation with the fabrication of transducer package 20 (FIG. 1). However, construction of MEMS sensor 30 is typically an independent process that may be performed prior to and separate from assembly of transducer package 20 in the same or in a different manufacturing facility.

Fabrication process 100 continues with a task 104. At task 104, the lead frame including peripheral terminal pads 22

(FIG. 2) and die attach pad 26 (FIG. 2) are constructed from a conductive material, such as copper alloy, per conventional processes known to those skilled in the art.

Following task 104, a task 106 is performed. At task 106, an adhesive die attach material, such as an epoxy, is dispensed onto die attach pad 26 of the lead frame. Other conventional thermal processing steps may be performed, as known to those skilled in the art.

Next, at a task 108, control circuit 28 (FIG. 2), i.e., the application specific integrated circuitry in the form of a silicon chip, is placed on top of and bonded to die attach pad 26. The position of control circuit 28 is precisely controlled such that the bond layer thickness is the same for all transducer packages 20 and the position of control circuit 28 on die attach pad 26 is within design specification requirements for centered placement.

Following task 108, a task 110 is performed. At task 110, another adhesive die attach material is dispensed onto the top of control circuit 28.

Fabrication process 100 continues with a task 112. At task 112, MEMS sensor 30 is bonded to the top of control circuit 28. The position of MEMS sensor 30 is precisely controlled such that the position of MEMS sensor 30 on control circuit 28 is within design specification requirements for centered placement.

Following task 112, a task 114 is performed. At task 114, molding compound 24 (FIG. 1) is applied over MEMS sensor 30 and control circuit 28 to cover all components of transducer package 20, except terminal pads 22 (FIG. 2) and die attach pad 26 (FIG. 2). Following task 114, fabrication process 100 exits.

An embodiment described herein comprises a device that includes a transducer package having at least two sensors disposed symmetrically relative to two axes of symmetry of the transducer package. In addition, the transducer package is centered at these two axes of symmetry. Another embodiment comprises a method for fabricating a transducer package having at least two sensors. The sensors of the transducer package may be accelerometers or other sensing devices configured to detect movement in two orthogonally oriented axes. The centered and balanced configuration of the transducer package results in generally symmetric displacement of the transducer package when exposed to an elevated temperature environment, and the symmetrical configuration of the sensors results in the reduction of a thermally induced offset artifact signal through a self-canceling effect. In addition, the sensors can be adapted to detect movement over different sensing ranges, for example, low-g, medium-g, high-g, or any combination thereof.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A transducer package comprising:
   a substrate exhibiting a first axis of symmetry and a second axis of symmetry arranged orthogonal to said first axis of symmetry;
   a first sensor adapted to detect movement of said transducer package over a first acceleration g level range; and
   a second sensor adapted to detect said movement of said transducer package over a second acceleration g level range, said second acceleration g level range differing from said first acceleration g level range, each of said first and second sensors being symmetrically arranged on said substrate centered on one of said first and second axes of symmetry and adapted to detect said movement in a direction that is substantially parallel to another of said first and second axes of symmetry.

2. A transducer package as claimed in claim 1 wherein:
   said first sensor is symmetrically arranged on said substrate centered on said second axis of symmetry such that said another of said first and second axes of symmetry is said first axis of symmetry; and
   said second sensor is symmetrically arranged on said substrate centered on said first axis of symmetry such that said another of said first and second axes of symmetry is said second axis of symmetry.

3. A transducer package as claimed in claim 1 wherein said each of said first and second sensors is centered on a common one of said first and second axes of symmetry.

4. A transducer package as claimed in claim 1 wherein said transducer package is symmetrically balanced relative to said first and second axes of symmetry.

5. A transducer package as claimed in claim 1 wherein said each of said first and second sensors comprises:
   a proof mass movable laterally with respect to said substrate;
   sense fingers extending from said proof mass; and
   fixed fingers in non-movable communication with said substrate, said sense fingers and said fixed fingers being longitudinally aligned with said one of said first and second axes of symmetry, and each of said sense fingers being disposed between a pair of said fixed fingers to form a differential capacitive structure.

6. A transducer package as claimed in claim 5 wherein for said each of said first and second sensors, said proof mass, said fixed fingers, and said sense fingers are symmetrically arranged relative to said one of said first and second axes of symmetry.

7. A transducer package as claimed in claim 5 wherein for each said differential capacitive structure, a first one of said pair of fixed fingers and one of said sense fingers produce a first thermally-induced artifact signal, and a second one of said pair of fixed fingers and said one sense finger produce a second thermally-induced artifact signal, said first and second artifact signals have substantially identical characteristics thereby nullifying one another.

8. A transducer package as claimed in claim 1 wherein said transducer package further comprises a third sensor symmetrically arranged on said substrate centered on said second axis of symmetry and adapted to detect said movement of said transducer package in said direction that is substantially parallel to said first axis of symmetry.

9. A transducer package as claimed in claim 8 wherein said transducer package further comprises a fourth sensor symmetrically arranged on said substrate centered on said first axis of symmetry and adapted to detect said movement of said transducer package in said direction that is substantially parallel to said second axis of symmetry.

10. A method of producing a transducer package comprising:
    providing a substrate exhibiting a first axis of symmetry and a second axis of symmetry arranged orthogonal to said first axis of symmetry;
    configuring a first sensor to detect movement of said transducer package over a first acceleration g level range; and
    configuring a second sensor to detect said movement of said transducer package over a second acceleration g level range, said second acceleration g level range differing from said first acceleration g level range;
    symmetrically arranging said first sensor on said substrate centered on said second axis of symmetry, said first sensor being adapted to detect said movement in a direction that is substantially parallel to said first axis of symmetry; and symmetrically arranging said second sensor on said substrate centered on said first axis of symmetry, said second sensor being adapted to detect said movement in said direction that is substantially parallel to said second axis of symmetry.

11. A method as claimed in claim 10 wherein said symmetrically arranging said first and second sensors comprises:

depositing a conductive layer over said substrate; and for each of said first and second sensors, patterning said conductive layer to produce a proof mass movable laterally with respect to said substrate, sense fingers extending from said proof mass, and fixed fingers non-movable with respect to said substrate, said sense fingers and said fixed fingers of said first sensor being longitudinally aligned with said second axis of symmetry, said sense fingers and said fixed fingers of said second sensor being longitudinally aligned with said first axis of symmetry, and each of said sense fingers being disposed between a pair of fixed fingers to form a differential capacitive structure.

12. A transducer package comprising:

a substrate having a planar surface and exhibiting a first axis of symmetry and a second axis of symmetry arranged orthogonal to said first axis of symmetry, said first and second axes of symmetry being substantially parallel to said planar surface, and said planar surface being balanced at an intersection of said first and second axes of symmetry;

a first sensor adapted to detect movement of said transducer package over a first acceleration g level range; and a second sensor adapted to detect said movement of said transducer package over a second acceleration g level range, said acceleration g level range differing from said first acceleration g level range, each of said first and second sensors being symmetrically arranged on said substrate centered on one of said first and second axes of symmetry and adapted to detect movement of said transducer package in a direction that is substantially parallel to another of said first and second axes of symmetry.

13. A transducer package as claimed in claim 12 wherein:

said first sensor is symmetrically arranged on said substrate centered on said second axis of symmetry such that said another of said first and second axes of symmetry is said first axis of symmetry; and said second sensor is symmetrically arranged on said substrate centered on said first axis of symmetry such that said another of said first and second axes of symmetry is said second axis of symmetry.

14. A transducer package as claimed in claim 13 wherein said transducer package further comprises:

a third sensor symmetrically arranged on said substrate centered on said second axis of symmetry and adapted to detect said movement of said transducer package in said direction that is substantially parallel to said first axis of symmetry; and a fourth sensor symmetrically arranged on said substrate centered on said first axis of symmetry and adapted to detect said movement of said transducer package in said direction that is substantially parallel to said second axis of symmetry.

15. A transducer package as claimed in claim 14 wherein:

said third sensor is adapted to detect said movement of said transducer package over said second acceleration g level range; and said fourth sensor is adapted to detect said movement of said transducer package over said first acceleration g level range.

16. A transducer package as claimed in claim 12 wherein:

said first sensor comprises a first proof mass movable laterally with respect to said substrate, first sense fingers extending from said first proof mass, and first fixed fingers in non-movable communication with said substrate, said first sense fingers and said first fixed fingers being longitudinally aligned with said second axis of symmetry, and each of said first sense fingers being disposed between a pair of first fixed fingers to form a first differential capacitive structure; and said second sensor comprises a second proof mass movable laterally with respect to said substrate, second sense fingers extending from said second proof mass, and second fixed fingers in non-movable communication with said substrate, said second sense fingers and said second fixed fingers being longitudinally aligned with said first axis of symmetry, and each of said second sense fingers being disposed between a pair of said second fixed fingers to form a second differential capacitive structure.

17. A transducer package as claimed in claim 16 wherein:

for each said first differential capacitive structure, a first one of said pair of first fixed fingers and one of said first sense fingers produce a first thermally-induced artifact signal, and a second one of said pair of first fixed fingers and said one first sense finger produce a second thermally-induced artifact signal, said first and second artifact signals have substantially identical characteristics thereby nullifying one another; and for each said second differential capacitive structure, a first one of said pair of second fixed fingers and one of said second sense fingers produce a third thermally-induced artifact signal, and a second one of said pair of second fixed fingers and said one second sense finger produce a fourth thermally-induced artifact signal, said third and fourth artifact signals have substantially identical characteristics thereby nullifying one another.

* * * * *